Nov. 3, 1964 W. A. BOYCE 3,155,481
METHOD AND APPARATUS FOR FORMING AND TEMPERING
TUBULAR GLASS FLARES
Original Filed Dec. 27, 1954 2 Sheets-Sheet 1
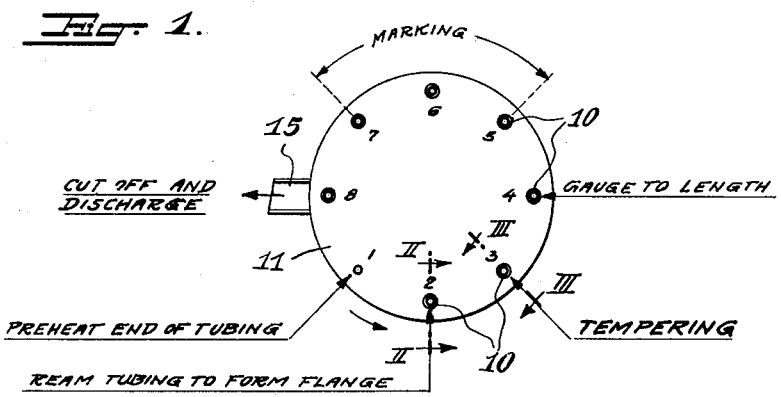
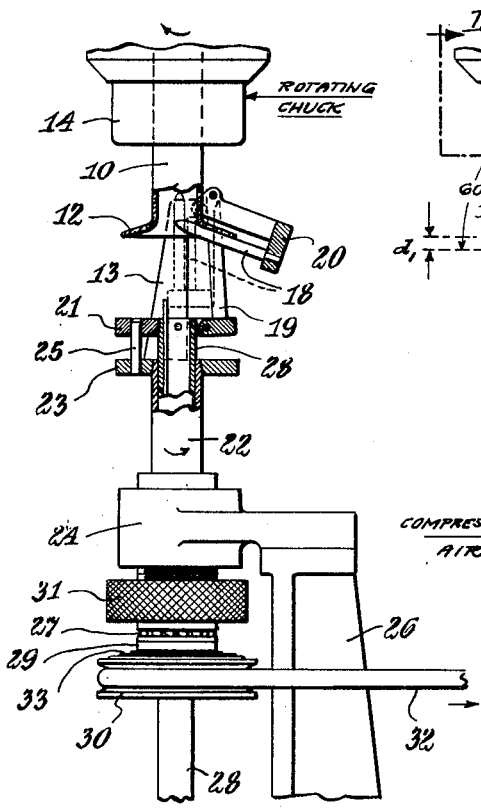
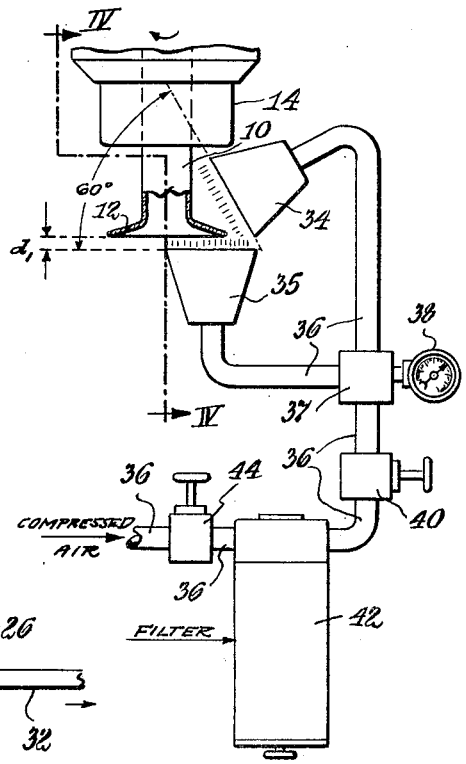
INVENTOR.
WALTER A. BOYCE
ATTORNEY.

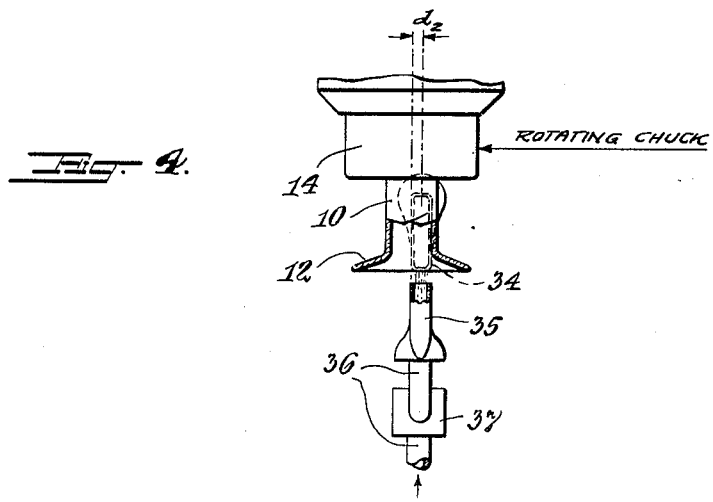
Fig. 4.
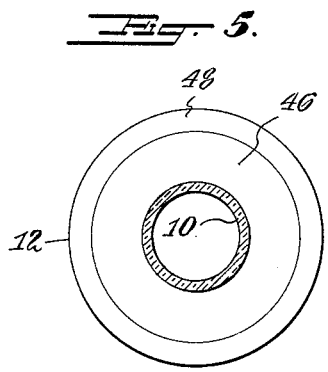
Fig. 5.
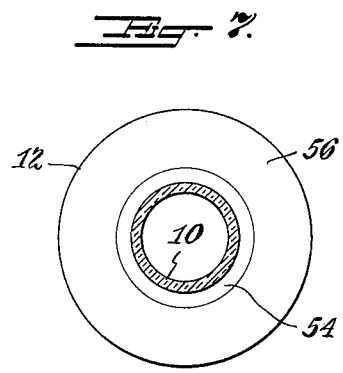
Fig. 7.
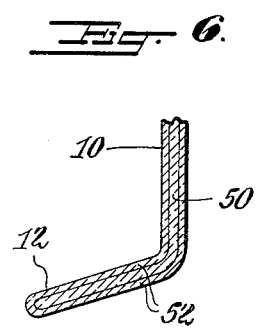
Fig. 6.
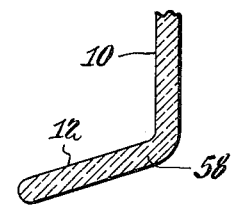
Fig. 8.
INVENTOR.
WALTER A. BOYCE.
ATTORNEY.

United States Patent Office 3,155,481
Patented Nov. 3, 1964

3,155,481
METHOD AND APPARATUS FOR FORMING AND TEMPERING TUBULAR GLASS FLARES
Walter A. Boyce, West Orange, N.J., assignor to Westinghouse Electric Corporation, East Pittsburgh, Pa., a corporation of Pennsylvania
Continuation of application Ser. No. 477,687, Dec. 27, 1954. This application July 3, 1958, Ser. No. 746,557
7 Claims. (Cl. 65—104)

This invention relates to the manufacture of glass flares and, more particularly, to an improved method for making flares used in the manufacture of stems for lamps and electronic tubes. This application is a continuation of application Serial No. 477,687, filed December 27, 1954, now abandoned, entitled "Manufacture of Glass Flares," and owned by the assignee of the instant application.

Heretofore it has been the universal practice to manufacture flares by heating the end of a length of glass tubing to plasticity, forming the soft glass into a flange, and then allowing the glass to cool freely until it was no longer plastic before gauging and cutting a section of the desired length from the tubing. Such sections of glass tubing having a flange formed on one end are known as flares and are used in a considerable range of lengths and sizes in the lamp and tube industry. It has been found that flares manufactured by the foregoing method have a strong tendency to break while being handled or to fracture during the subsequent sealing-in operation. Losses arising from such breakage have been considered unavoidable in the past due to the inherent fragility of the flares, particularly the frequent inability of the flanged portion thereof to withstand the thermal shock imparted to the glass by the sudden application of heat required to properly seal the flare to the glass envelope. While the breakage of the flares themselves constituted a loss in terms of labor and material, their cost in comparison to the value of the component parts which has to be discarded when the flare cracked during the more advanced stages of manufacture, such as during the sealing-in operation, was negligible.

It is, accordingly, the general object of the present invention to avoid and overcome the foregoing and other deficiencies of the prior art by providing a method of manufacturing glass flares which are uniform in size and shape and not easily broken or cracked.

Another object is to provide a simple economic means of controlling the mechanical and thermal shock resistant properties imparted to glass flares during their manufacture.

A still further and more specific object is to provide a method of imparting a predetermined stress pattern to the structure of glass flares during the normal sequence of operations required to manufacture them such that the mechanical and thermal shock resistant properties of the flanged portions thereof are materially improved.

The aforesaid objects of the invention, and other objects which will become apparent as the description proceeds, are achieved by controlling the heat applied to the end of the glass tube prior to the flange-forming operation, by providing means for rapidly and uniformly cooling the flanged and adjacent tubular portions of the tube to a temperature well below the strain point of the glass immediately after the flange has been formed from the soft glass, and by controlling the application of the cooling medium to prevent distorting the contour of the hot flange.

Specifically, the abrupt cooling of the glass from its plastic state to a temperature below its strain point tempers or hardens the surfaces thereof and increases the resistance of the flanged portion of the flare to mechanical or thermal shock. This improvement in the shock resistant properties of this portion of the flare is obtained by imparting to the glass a predetermined stress pattern whereby the surface layers thereof are under compression and held in equilibrium by an interior region which is in tension. The compressive strength of glass is much greater than its tensile strength and therefore a compressive layer formed on the surface of a glass member, such as by heating the glass to a temperature well above its annealing point and then suddenly applying a cooling medium to reduce the temperature below the strain point, greatly increases the ultimate strength of the member. In the present invention it has been found that by increasing the heat applied to the end of the glass tubing prior to the flange-forming operation on a conventional automatic flare machine, the temperature of the glass after the flange has been formed is such that a sudden cooling thereof tempers this portion of the flare and greatly improves the strength of the finished product without causing deleterious distortions thereof.

Further, means for cooling the flanged and adjacent tubular portions of the tubing can be readily incorporated into automatic flare-making machines now in use by providing nozzles so shaped and arranged that when connected to a pressurized supply of a suitable cooling medium, such as compressed air, a stream of the cooling medium is ejected from said nozzles at a predetermined velocity and impinges on the flanged surfaces of the tubing immediately after the flange has been formed from the soft glass in a manner such that the glass is rapidly and uniformly cooled without distorting the shape or size of the flange. A typical automatic flare-making machine which lends itself to such modification is described in U.S. Patent No. 1,546,353. The foregoing modifications to the apparatus and method heretofore employed in the manufacture of flares greatly increases the strength of the finished product thereby minimizing losses in labor, material, and production.

For a better understanding of this invention, reference should be had to the accompanying drawings, in which like numerals of reference indicate similar parts throughout the several views, wherein:

FIG. 1 is a diagramatic plan view of an automatic flare-making machine showing the various steps in the manufacture of a glass flare and the location of the cooling or tempering station in relation to the normal sequence of operations;

FIG. 2 is a fragmentary elevational view, partly in section, of the flange-forming mechanism and rotating chuck assembly at station 2 in FIG. 1, taken along the line II–II in the direction of the arrows;

FIG. 3 is fragmentary side elevational view, partly in section, of the tempering apparatus and rotating chuck assembly at station 3 in FIG. 1, taken along the line III–III in the direction of the arrows;

FIG. 4 is a fragmentary end elevational view, partly in section, of the upper portion of the cooling apparatus employed at the tempering station, shown in FIG. 3, taken along the line IV—IV in the direction of the arrows, showing the rotating chuck assembly and the location of the nozzles in relation to the flange;

FIGS. 5 and 7 are plan views of a tempered and normal flare respectively, showing the radial strain pattern in the flanges; and FIGS. 6 and 8 are fragmentary longitudinal sectional views, illustrating the longitudinal strain patterns of a tempered and normal flare respectively.

Although the principles of this invention are broadly applicable to other methods of manufacturing flares, the invention is usually employed in conjunction with an automatic flare-making machine and hence it has been so illustrated and will be so described.

Referring now to the form of the invention illustrated in the accompanying drawings, the portion of the rotating chuck 14 shown in FIG. 2 is representative of one of a series of chucks generally employed in a conventional automatic flare-making machine of the type described in United States Patent No. 1,546,353. In the machine herein shown eight of said chucks 14 are equidistantly mounted around the periphery of a circular table or rotor 11 and intermittently advanced or indexed in a counter-clockwise direction, as viewed in FIG. 1, through eight stations by means and in the manner described in the aforementioned patent. A length of glass tubing 10 is inserted into each of the chucks 14 and securely held as the chuck is advanced through the first three of the above-mentioned stations. At the fourth station the chuck mechanism is released and a predetermined portion of the tubing is fed through the chuck thereby gauging the length of the finished flare. Hence, after a flare is completed and cut from the tubing, the end of said tubing is in position for the formation of the next flare. In addition to revolving counterclockwise with the rotor, as viewed in FIG. 1, each chuck is rotated clockwise about its own axis, as indicated by the arrows in FIGS. 2 and 3, so that each length of glass tubing 10 therein is rotated about its longitudinal axis. At each of the several stations the end of the glass tubing 10 is subjected to the different operations involved in the making of a flare so that after the table or rotor 11 has completed one revolution, the required sequence of operations have been performed.

The sequence of operations followed in accordance with this invention is shown in FIG. 1. At station 1, the end of the rotating glass tubing 10 is preheated by means of gas burners and prepared for the flanging operation. It is important that the glass be heated uniformly and to the proper temperature at this stage otherwise the glass may chip or adhere to the reamer during the flanging operation, or the flange will be improperly tempered and susceptible to fracture. When the glass has been heated to the proper temperature, as for example at least 200° C. above the softening point of the glass, rotor 11 is automatically advanced to station 2 where the application of heat is continued and a flange is formed or spun on the end of the glass tubing 10 by means of a rotating reamer or pencil which wipes the soft glass into a flange of the desired shape and diameter. According to this invention, after the flange has been formed, the glass tubing 10 is advanced to station 3 where the hot glass is force cooled to a temperature below its strain point through the application of a compressed air stream thereby tempering the flanged tube end. The pressure of the applied air stream must be carefully controlled; too great a pressure may deform the soft glass during the initial cooling period thereby distorting the contour or size of the finished flare, while insufficient pressure will not cool the glass rapidly enough to impart the desired stress pattern to the flare thereby deleteriously affecting its ultimate strength. In prior art practice, the hot glass was permitted to cool at a normal rate for the sole purpose of allowing the glass to set or become sufficiently hard in order to prevent distorting the flange during the gauging operation which followed. Moreover, it was believed, prior to this invention, that subjecting the glass to a sudden temperature change at this point would cause it to fracture or introduce thermal strains which would weaken the finished flare and render it more susceptible to fracture.

At station 4, the chuck is loosened and the glass tubing 10 permitted to drop a predetermined distance thereby gauging the length of the finished flare. Following this, the tubing is marked or prepared for cutting by gradually building up heat in the glass at the point selected for cut-off by properly positioning gas burners at stations 5, 6 and 7. At station 8 a pair of cutting wheels cooperate to cut the flanged-end from the tubing and the completed flare is discharged into a suitably placed container by means of a chute 15. The rotating chuck 14 is then indexed to station 1 and the foregoing cycle of operations is repeated. This sequence of operations, with the exception of the tempering process and modifications hereinbefore noted, is well known in the art and may be accomplished by means such as those described in the above-mentioned patent. The essence of this invention resides in the manner in which the flares are tempered during the normal sequence of operations required to manufacture them and in the cooling apparatus employed to effect the tempering and these are hereinafter more fully described.

After the lower end of the glass tubing 10 has been properly heated at station 1 as previously described, the chuck 14 is advanced to station 2 where a flange 12 is formed or spun on the end of said tubing 10. In general, the flange-forming operation consists of inserting a suitable flanging mechanism into the heated tube end and thereafter activating said mechanism so that the soft glass wall is molded or spun radially outward from its vertical position thereby forming a flange 12. While various means may be utilized to accomplish this result, the form of the invention illustrated employs a reamer or pencil 18 which is inserted into the end of the glass tubing 10 while in a substantially vertical position, as indicated by the broken lines in FIG. 2, and thereafter revolved and progressively tilted outwardly to an almost horizontal position, as shown by the solid lines, thereby wiping or spinning the soft glass radially outward with respect to the axis of the tubing 10 and forming a flange 12 of the desired shape and diameter on the end of said tubing.

The pencil 18 is activated by a flanging mechanism which, briefly stated, comprises a hollow tubular member 22 rotatably secured to a stationary part of the machine by means of a bearing collar 24 and standard 26. An elevating tube 28 disposed in telescope reciprocable relation within the aforesaid tubular member 22 cooperates, in a manner hereinafter more fully described, with a stirrup 20 and pencil 18 assembly pivotally attached to a pair of connecting links 19 hingedly fastened to a cap 21 mounted on the end of said elevating tube to progressively tilt said pencil 18 away from its normal vertical position when said elevating tube is longitudinally displaced as by a cam (not shown). A cap 23 secured to the end of the tubular member 22 carries a pin 25 which rides within an aperture provided in the cap 21 thereby coupling said tubular member and elevating tube 28 together with respect to rotational displacement. The stirrup 20 is pivotally coupled to the upper ends of a pair of standards 13 attached to the cap 23 which standards straddle the end of the glass tubing 10 so as to enable the pencil 18, which is secured to a horizontal cross-member of said stirrup, to be inserted into the tubing and said stirrup to swing on said standards. The tubular member 22 and elevating tube 28 are so positioned and held by the bearing collar 24 that they are in axial alignment with the chuck 14 and glass tubing 10 and are free to move in a longitudinal direction. A thrust ball race 27 carried by a flange 29 on the lower end of tubular member 22 takes up the thrust between the flange 29 and an adjustable stop 31 mounted on the collar 24 when said tubular member 22 is elevated against said stop. Elevating tube 28 is rotated in a counter-clockwise direction, as indicated by the arrow in FIG. 2, by means of a pulley 30 attached thereto which is driven by a belt 32 coupled to a motor (not shown). A helical spring 33 interposed between the pulley 30 and flange 29 keeps the thrust ball race 27 and tubular member 22 normally raised with respect to said pulley 30 and elevating tube 28. The rotative motion imparted to the elevating tube 28 is transmitted to the tubular member 22 and standards 13 mounted thereon by the pin and aperture arrangement above-described. Any upward displacement of the elevating tube 28 with respect to tubular member 22 is likewise transmitted to the connecting links 19 by the cap 21 thereby causing the stirrup 20 to swing on the standards 13 and tilt the lower end of the pencil 18 outwardly from a vertical to a nearly horizontal position.

Hence, when the elevating tube 28 is gradually displaced upwardly by the cam (not shown) the pulley 30 is raised thus partially compressing the spring 33 and forcing the thrust ball race 27 and tubular member 22 upward until said ball race seats against the stop 31 whereupon the upward movement of the tubular member 22 ceases. The elevating tube 28, however, continues to move upwardly by virtue of further compression of the spring 33 until said spring is compressed flat, as shown in FIG. 2. The upward movement of the tubular member 22 inserts the pencil 18 into the lower end of the glass tubing 10, as indicated by the broken lines in FIG. 2, whereas the further upward movement of the elevating tube 28 after the upward travel of said member 22 has been stopped causes the stirrup 20 to pivot about the standards 13 and progressively swing the pencil 18 through the successive angular positions required to form the flange 12 from the soft glass on the end of the tubing 10 and to finally assume the position shown by the solid lines in FIG. 2. The elevating tube 28 is then permitted to drop causing the pencil 18 to return to its normal vertical position, whereupon the tubular member 22 moves downwardly thereby extracting the flanging mechanism from the flanged tube end.

Immediately after the flange 12 is formed on the preheated end of the glass tubing 10 by the wiping action of the rotating pencil 18 and the flanging mechanism is withdrawn, the rotating chuck 14 is advanced to station 3 where, in accordance with this invention, the glass is quickly cooled as shown in FIG. 3. While various means may be utilized to cool the hot glass, a preferred embodiment of the invention employs two nozzles 34 and 35 having tip portions contoured to provide substantially slot-like outlet orifices. Said nozzles and orifices are oriented so as to lie in the same vertical plane, one above the other (as viewed in FIGS. 3 and 4), with the lip of the nozzle 35 substantially parallel to the horizontal plane containing the rim of the flange 12, and separated therefrom by a distance $d_1$. In order to achieve the maximum cooling of both the upper and lower surfaces of the flange 12 without distorting the soft glass, nozzle 34 is mounted above and opposite nozzle 35 in such a position that the angle defined by the orifice lips is approximately 60°, as illustrated in FIG. 3. Thus, the cooling medium is dispensed by the nozzles 34 and 35 in a substantially uniplanar stream through which the rotating flange 12 passes, thereby effecting a rapid uniform cooling of the hot glass without deformation.

FIG. 4 is an end view of a portion of the tempering apparatus illustrated in FIG. 3 showing the uniplanar vertical positioning of the nozzles 34 and 35 and their location in relation to the flange 12 in the horizontal direction. In order to prevent the reflection of the compressed air stream from the glass surfaces into the machine proper, where it would interfere with the glass-working fires, it has been found desirable to offset the nozzles 34 and 35 just to the right of the axis of the glass tubing 10 so that their respective center lines are separated by a distance $d_2$, thereby enabling the glass surfaces to deflect the air stream out of the machine. With this relationship the center line of the tubing 10 is substantially coincident with the left hand edge of the nozzles 34 and 35, as viewed in FIG. 4.

Returning to the showing of the cooling apparatus in FIG. 3, the nozzles 34 and 35 are connected to a suitable source of pressurized cooling medium, such as compressed air, by means of conduits 36. In order to control the velocity of the cooling medium and thus prevent distortion of the hot flange 12 during the cooling process, a regulating valve 40 and a four-way connector 37 having a pressure gauge 38 mounted thereon are provided in the aforesaid conduit means, said gauge being desirably positioned within visible range of said valve 40 so that the line pressure or rate of flow of the cooling medium may be conveniently and accurately controlled.

Experience has shown that impurities in the high-pressure air supply may be deposited on the surfaces of the flange 12 and glass tubing 10 during the tempering operation, subsequently contaminating the atmosphere of the finished lamp and deleteriously affecting the quality thereof. This is particularly true of oil and water which condense on the inner walls of the cool air line and are later ejected and deposited on said glass surfaces. It has been found desirable, therefore, to provide a filter 42, to remove oil, water and other such impurities from the air supply. In addition, a stop valve 44 may be provided to isolate the tempering apparatus from the compressed air supply whenever necessary. The conduits 36 are preferably fabricated from copper or similar material so that they are substantially rigid thereby facilitating the proper positioning of nozzles 34 and 35.

From the foregoing it will be seen that air from a compressed air supply enters the filter 42 at a substantially high pressure, such as at least 30 p.s.i., when the stop valve 44 is open, said filter 42 removing impurities, particularly oil and water, from said air which then passes through the regulating valve 40, where the pressure of said air is limited to some predetermined value. The air then passes through the four-way connector 37, actuates the pressure gauge 38, and flows along two separate branches until it is forcibly ejected through the slot-like orifices of the nozzles 34 and 35 at a velocity determined by said regulating valve 40, thereby impinging on the upper and lower surfaces of the hot rotating flange 12 on the end of the glass tubing 10 and rapidly cooling said surfaces at a uniform rate.

It is generally known that a glass fracture always originates at an exposed surface from a tension strain imparted to the glass which exceeds the ultimate strength of the member. In a glass flare the tension strain may be imparted by mechanical shock or a sudden temperature change. In particular, the laterally protruding or flanged portion 12 of the flare is, by its nature, most frequently exposed to mechanical shock during handling and thermal shock during the subsequent sealing-in operation. Thus, it is generally the flanged portion 12 which cracks during handling or subsequent lamp manufacturing operations.

However, when the hot flange 12 and adjacent tubular portion of the glass tubing 10 is suddenly cooled, as hereinbefore described, a strong compression stress is introduced the outer layers thereof. This compressive layer, in effect, hardens or tempers the glass structure and increases the ultimate strength of the flange since subsequent tension stresses applied to the glass as a result of mechanical or thermal shocks must first overcome or neutralize the surface compression before sufficient tension strains can develop to materially weaken or fracture the glass.

FIGS. 5 and 7 are plan views, respectively, of a flare tempered in accordance with this invention and of a flare normally cooled in accordance with prior art practice, showing the radial stress patterns typical of flares so treated. In general, the configuration of the radial stress pattern typical of a properly tempered flange 12, as illustrated in FIG. 5, consists of two mutually contiguous and concentric zones or belts surrounding the tubular section 10 of the flare. Immediately adjacent to said tubular section 10 is a substantially wide zone 46 which represents an area of tension, as for example 18 kilograms per square centimeter. The second zone 48 extends to the periphery of the flange 12 and represents a region of compression, as for example 36 kilograms per sq. centimeter.

Conversely, the configuration of the radial stress pattern typical of flares normally cooled in accordance with the prior art practice indicates a radical difference in the stress relationship when the flange 12 is permitted to cool gradually. Here, the inner zone of tension 54 is materially reduced in area while the outermost zone of compression 56 has increased by extending further inwardly as illustrated in FIG. 7. Hence, it would appear from the foregoing that as the glass gradually cools the outermost compressive zone slowly progresses inwardly, effectively compacting the zone of tension into an area immediately surrounding the base of the tubular section 10. These patterns, however, merely represent the distribution of radial stresses in the flange 12 necessary to equalize the forces imparted to the glass under the different longitudinal stress conditions developed within the glass structure of the flange itself and, as such, do not strengthen the flange per se.

FIGS. 6 and 8, on the other hand, illustrate the essential difference between a tempered and untempered flare respectively. FIG. 6 represents a lingitudinal sectional view of a flange 12 and an adjacent portion of the tubular section 10 tempered in accordance with this invention and illustrates the longitudinal stress pattern imparted to the glass structure. The intermediate portion or core 50 of the glass wall comprising the flange 12 and the adjacent tubular portion of the flare is in tension and held in equilibrium by the equal and opposite compressive force of the outer layers 52 which completely envelope said core 50. In a properly tempered flare the compressive force is at least 75 kilograms per square centimeter. A similar view of an untempered flare shows that the glass comprising the flange 12 and adjacent portion of the tubular section 10 is substantially devoid of such stresses, as shown by FIG. 8, and consequently lacks the fortification afforded by the aforementioned compressive sheath 52.

The desired stress pattern can only be imparted to the glass structure of the flange by heating the glass to the proper temperature prior to the flange-forming operation and by controlling the application of the cooling medium during the tempering process. These factors are critical by virtue of the fact that the temperature of the glass prior to cooling coupled with the rate of cooling determine the stress pattern and ultimate strength of the flanged portion of the flare. Furthermore, the cooling medium must be so controlled that all surfaces of the flange are cooled at the same rate without deforming the soft glass during the initial cooling stage. The majority of flares are manufactured from "soft" lead type glass. A typical lead glass composition is approximately as follows: 68% silica, 15% lead oxide, 10% soda, 6% potash, and 1% lime. Glass of this type has a working point of 975° C., a softening point of approximately 630° C., and a strain point of about 400° C. Hence, for flares manufactured from this type glass the end of the glass tubing 10 must be heated to at least 830° C., prior to the flange-forming operation in order that the glass remain at a sufficiently high temperature, as for example 800° C., after said flanging operation, to permit the desired stress pattern to be imparted to the glass structure by the tempering process.

In addition, to obtain the proper rate and uniformity of cooling it has been found desirable to position the nozzles 34 and 35 as hereinbefore described so that the lip of the lower nozzle 35 is separated from the plane containing the rim of the flange 12 by a distance $d_1$, such as between ⅛ to ¼ of an inch, as shown in FIG. 3. Similarly, it has been found that offsetting the nozzles 34 and 35 in the horizontal direction with respect to the axis of the glass tubing 10 (FIG. 4) so that their respective center lines are separated by a distance $d_2$, such as between ¼ to ½", provides the desired cooling effect and deflects the air stream out of the machine thereby eliminating adverse effects of such air on the glass-working fires. In order to prevent distortion of the soft glass during the initial cooling of the flange 12, it has been found that an air pressure of not more than 5 lbs. per sq. inch should be used for a flare manufactured from ¼" tubing and having a flange spread or diameter of approximately 7/16". For larger flares the air pressure must be increased due to the larger amount of heat which must be extracted. For example, to properly cool a flange ¼" in diameter formed on the end of a tube ⅝" in diameter without causing distortion, an air pressure of not more than 16 lbs. per sq. in. should be employed.

It will be recognized from the foregoing that the objects of the invention have been achieved insofar as a simple and inexpensive method and means for tempering glass flares during the normal sequence of operations required to fabricate them has been provided whereby the finished flares are strengthened sufficiently to enable them to withstand the mechanical and thermal shocks encountered during normal handling and subsequent assembly operations and the resultant losses caused by such breakage minimized. For example, the breakage due to mechanical shock caused by ejecting the finished flares from the machine into the hopper has been reduced from a normal 5% and greater to less than 1%, while a reduction from 2% to less than 0.01% cracked flares due to thermal shock on the sealing machine has been realized by using this method of flare manufacture. The method is also particularly suited for application on conventional type flare-making machines generally employed in the industry by virtue of the fact that the normal sequence of operations of such machines requires that the glass be heated and cooled. Moreover, the tempering process and the ultimate strength of the flares can be controlled by apparatus which is simple and economical to install and operate.

Although a preferred embodiment of the invention has been illustrated in accordance with the patent statutes, it will be understood that various modifications may be made in the details of construction, combination and arrangement of parts without departing from the spirit and scope of the invention.

I claim:

1. In the manufacture of a glass flare, the process of forming a flange on the end of a glass tube and tempering said flange during the normal sequence of operations required to manufacture the flare which process comprises, increasing the heat input to the part of said glass tube to be flanged by an amount sufficient to increase the temperature thereof to a temperature above the softening point but below the working point of the glass and above the temperature required to render it sufficiently plastic for the flange-forming operation, forming the heated part of said tube into a flange while maintaining the glass at a predetermined temperature above its annealing point, and immediately thereafter abruptly cooling said flange below the strain point of the glass to permanently impart to the surface layers thereof a predetermined compressive stress.

2. In the manufacture of a glass flare, the process of forming a flange on the end of a glass tube and tempering said flange during the normal sequence of operations required to manufacture the flare which process comprises, increasing the heat input to the end of said glass tube by an amount sufficient to increase the temperature thereof to a temperature above the softening point but below the working point of the glass and above the temperature required to render it sufficiently plastic for the flange-forming operation, forming said heated tube end into a flange without reducing the temperature thereof below the softening point of the glass, and immediately thereafter applying a cooling medium to the surfaces of said flange to cool the glass to a temperature below its strain point without distorting said flange and permanently impart to said surfaces a predetermined compressive stress.

3. In the manufacture of a glass flare, the process of forming a flange on the end of a glass tube and tempering said flange during the normal sequence of operations required to manufacture the flare which process comprises, increasing the heat input to the end of said glass tube by an amount sufficient to increase the temperature thereof to a temperature approximately 200° C. above the softening point of the glass, forming said heated tube end into a flange without reducing the temperature thereof below the softening point of the glass, and immediately thereafter rotating said glass tube about its longitudinal axis and applying a controlled stream of compressed air to the surfaces of said flange to cool the glass to a temperature below its strain point without distorting said flange and permanently impart to said surfaces a predetermined compressive stress.

4. In the manufacture of a glass flare, the process of forming a flange on the end of a glass tube and tempering said flange during the normal sequence of operations required to manufacture the flare which process comprises, increasing the heat input to the end of said glass tube by an amount sufficient to increase the temperature thereof to a temperature above the softening point but below the working point of the glass and above the temperature required to render it sufficiently plastic for the flange-forming operation, forming said heated tube end into a flange while maintaining the glass at a predetermined temperature above its annealing point, and immediately thereafter rotating the glass tube about its longitudinal axis and passing said flange through a controlled air stream to cool the glass to a temperature below its strain point abruptly without distorting said flange and permanently impart to said surfaces a permanent compressive stress of at least 75 kilograms per square centimeter.

5. In combination with an automatic flare-making machine wherein a length of glass tubing is rotated about its longitudinal axis and indexed through a series of work stations including a preheating station and a flange-forming station; apparatus for rapidly and uniformly cooling the flanged portion of said tubing immediately after the preheating and flange-forming operations have been completed thereon and thus providing means for tempering said portion during the normal sequence of operations required to manufacture said flare comprising; means for holding said tubing; means for rotating said holding means; dispensing means secured to a stationary part of the machine at a tempering station immediately following the flange-forming station for applying a cooling medium to the surfaces of the hot flanged portion of said tubing; conduit means for connecting said dispensing means with a pressurized supply of said cooling medium; and means in said conduit means for controlling the rate of flow of said cooling medium; said dispensing means comprising a pair of nozzles disposed in a common plane and contoured to eject said cooling medium along said plane; said nozzles being so oriented relative to one another and to said holding means that said cooling medium is dispensed by said nozzles in a substantially uniplanar stream which impinges upon both sides of the flanged portion of said glass tubing when said tubing and holding means are located at said tempering station.

6. In combination with an automatic flare-making machine wherein a length of glass tubing is rotated about its longitudinal axis and indexed through a series of work stations including a preheating station and a flange-forming station; apparatus for rapidly and uniformly cooling the flanged portion of said tubing immediately after the preheating and flange-forming operations have been completed thereon and thus providing means for tempering said portion during the normal sequence of operations required to manufacture said flare comprising; means for holding said tubing; means for rotating said holding means; dispensing means secured to a stationary part of the machine at a tempering station immediately following the flange-forming station for applying a cooling medium to the surfaces of the hot flange formed on the end of said tubing; conduit means for connecting said dispensing means with a pressurized supply of said cooling medium; means in said conduit means for controlling the rate of flow of said cooling medium; said dispensing means comprising a pair of nozzles arranged in a common plane and contoured to dispense said cooling medium along said plane; the relationship of said nozzles to each other and to said holding means being such that, when said tubing and holding means are located at said tempering station, the lip of one of said nozzles is below said flange and substantially parallel to the plane containing the rim of said flange but spaced a predetermined distance therefrom, and the lip of the other of said nozzles is above said flange and disposed at an angle of approximately 60° with respect to the lip of the first said nozzle; and means in said conduit means for removing impurities from said cooling medium, whereby said cooling medium is purified and then dispensed by said nozzles in a substantially uniplanar stream which impinges upon both sides of said flange and effects the rapid and uniform cooling thereof without contaminating the glass.

7. In combination with an automatic flare-making machine wherein a length of glass tubing is rotated about its longitudinal axis and indexed through a series of work stations including a preheating station and a flange-forming station; apparatus for rapidly and uniformly cooling the flanged portion of said tubing immediately after the preheating and flange-forming operations have been completed thereon and thus providing means for tempering said portion during the normal sequence of operations required to manufacture said flare comprising; means for holding said tubing; means for rotataing said holding means; dispensing means secured to a stationary part of the machine at a tempering station immediately following the flange-forming station for applying a cooling medium to the surfaces of the hot flange formed on the end of said tubing; conduit means for connecting said dispensing means with a pressurized supply of said cooling medium; and means in said conduit means for controlling the rate of flow of said cooling medium; said dispensing means comprising a pair of nozzles that are disposed in a common plane and have flat tips with substantially slot-like outlet orifices adapted and oriented to dispense said cooling medium along said plane; said nozzles being so oriented with respect to each other and to said holding means that, when said flanged tubing and holding means are located at said tempering station, the lip of one of said nozzles is below said flange and substantially parallel to the plane containing the rim of said flange but spaced a predetermined distance therefrom, and the lip of the other of said nozzles is disposed above said flange and defines an angle of approximately 60° with the lip of the first said nozzle; the plane containing said nozzles being parallel to but slightly offset from the axis of the glass tubing when the latter is at said tempering station, whereby said cooling medium is dispensed by said nozzles in a substantially uniplanar stream which impinges upon both sides of said flange and is subsequently deflected by said tubing out of the machine.

References Cited in the file of this patent

UNITED STATES PATENTS

| | | |
|---|---|---|
| 1,483,461 | Littleton | Feb. 12, 1924 |
| 2,106,193 | Sloan | Jan. 25, 1938 |
| 2,254,227 | Lewis | Sept. 2, 1941 |
| 2,375,944 | Quentin | May 15, 1945 |
| 2,418,713 | Holmes et al. | Apr. 8, 1947 |
| 2,534,547 | Eisler | Dec. 19, 1950 |
| 2,596,899 | Kahle | May 13, 1952 |
| 2,680,936 | Grotefeld | June 15, 1954 |